United States Patent
Karni et al.

(10) Patent No.: US 11,118,575 B2
(45) Date of Patent: Sep. 14, 2021

(54) SOLAR SYSTEM FOR ENERGY PRODUCTION

(71) Applicant: YEDA RESEARCH AND DEVELOPMENT CO. LTD., Rehovot (IL)

(72) Inventors: Jacob Karni, Rehovot (IL); Leon Karni, Rehovot (IL)

(73) Assignee: YEDA RESEARCH AND DEVELOPMENT CO. LTD.

(*) Notice: Subject to any disclaimer, the term of this patent is extended or adjusted under 35 U.S.C. 154(b) by 0 days.

(21) Appl. No.: 16/495,487

(22) PCT Filed: Mar. 7, 2018

(86) PCT No.: PCT/IL2018/050262
§ 371 (c)(1),
(2) Date: Sep. 19, 2019

(87) PCT Pub. No.: WO2018/173038
PCT Pub. Date: Sep. 27, 2018

(65) Prior Publication Data
US 2020/0095984 A1     Mar. 26, 2020

Related U.S. Application Data

(60) Provisional application No. 62/475,385, filed on Mar. 23, 2017.

(51) Int. Cl.
| | |
|---|---|
| *F03G 6/06* | (2006.01) |
| *F24S 23/77* | (2018.01) |
| *F24S 60/10* | (2018.01) |
| *F24S 10/30* | (2018.01) |

(52) U.S. Cl.
CPC ............... *F03G 6/06* (2013.01); *F24S 10/30* (2018.05); *F24S 23/77* (2018.05); *F24S 60/10* (2018.05)

(58) Field of Classification Search
CPC ... F03G 6/06; F24S 60/10; F24S 23/77; F24S 10/30
See application file for complete search history.

(56) References Cited

U.S. PATENT DOCUMENTS

| | | |
|---|---|---|
| 4,185,456 A | 1/1980 | Cummings |
| 4,811,555 A | 3/1989 | Bell |
| 5,175,995 A | 1/1993 | Pak et al. |

(Continued)

FOREIGN PATENT DOCUMENTS

| | | |
|---|---|---|
| CN | 1223355 A | 7/1999 |
| CN | 101738120 A | 6/2010 |

(Continued)

OTHER PUBLICATIONS

"247SOLAR Plants", http://www.wilsonsolarpower.com/, Last accessed. Jul. 9, 2020, 8 pages.

(Continued)

*Primary Examiner* — Shafiq Mian
(74) *Attorney, Agent, or Firm* — Dorsey & Whitney LLP

(57) ABSTRACT

The present invention relates to the utilization of solar energy for generation of electricity and/or production of clean fuels or other chemicals, as a means for long term, transportable storage of inherently intermittent solar energy.

18 Claims, 12 Drawing Sheets

(56) References Cited

U.S. PATENT DOCUMENTS

| | | | |
|---|---|---|---|
| 5,245,986 A | 9/1993 | Karni | |
| 5,501,078 A | 3/1996 | Paolino | |
| 6,832,485 B2* | 12/2004 | Sugarmen | F02C 3/20 60/780 |
| 7,895,822 B2 | 3/2011 | Hoffmann et al. | |
| 8,268,138 B2* | 9/2012 | Karni | C01B 3/042 204/263 |
| 8,960,184 B2 | 2/2015 | Kami | |
| 2002/0004152 A1 | 1/2002 | Lawrence et al. | |
| 2002/0048545 A1 | 4/2002 | Lewis | |
| 2002/0142208 A1 | 10/2002 | Bowie et al. | |
| 2005/0241311 A1 | 11/2005 | Keith et al. | |
| 2007/0199300 A1 | 8/2007 | Scott et al. | |
| 2010/0146927 A1 | 6/2010 | Wilmot et al. | |
| 2010/0176602 A1* | 7/2010 | Shinnar | F28D 20/0056 290/1 A |
| 2010/0212656 A1 | 8/2010 | Qiu et al. | |
| 2011/0108435 A1* | 5/2011 | Karni | C01B 3/042 205/628 |
| 2011/0283700 A1* | 11/2011 | Zohar | H02K 7/1807 60/641.15 |
| 2012/0060418 A1 | 3/2012 | Michael et al. | |
| 2013/0043138 A1* | 2/2013 | Karni | C01B 13/0251 205/340 |
| 2013/0229018 A1 | 9/2013 | Jacob et al. | |
| 2013/0298568 A1* | 11/2013 | Pierson | F01K 23/10 60/774 |
| 2014/0123646 A1 | 5/2014 | Russell et al. | |
| 2015/0143806 A1* | 5/2015 | Friesth | F24S 25/50 60/517 |
| 2015/0167648 A1 | 6/2015 | Bergan | |
| 2015/0253039 A1 | 9/2015 | Erickson et al. | |
| 2016/0069329 A1* | 3/2016 | Brodetsky | F02C 3/04 60/641.14 |
| 2016/0146507 A1* | 5/2016 | Johnson | F24S 30/45 126/714 |
| 2016/0222948 A1* | 8/2016 | Kukonya | F01K 13/00 |
| 2016/0251767 A1 | 9/2016 | Rehovot et al. | |

FOREIGN PATENT DOCUMENTS

| | | | |
|---|---|---|---|
| CN | 201903196 U | 7/2011 | |
| CN | 104603570 A | 5/2015 | |
| CN | 105008840 A | 10/2015 | |
| EP | 831205 A2 | 3/1998 | |
| EP | 3002423 A1 * | 4/2016 | F01K 23/10 |
| WO | 9744574 A1 | 11/1997 | |
| WO | 2010013244 A2 | 2/2010 | |
| WO | 2014064673 A2 | 5/2014 | |

OTHER PUBLICATIONS

Laing, et al., "Using concrete and other solid storage media in thermal energy storage (TES) systems", Advances in Thermal Energy Storage Systems, University of Applied Sciences, Germany, formerly of German Aerospace Center (DLR), Germany; German Aerospace Center (DLR), 2015, pp. 65-86.

International Search Report and Written Opinion for Application No. PCT/IL2018/050262.

* cited by examiner

SOLAR SYSTEM FOR ENERGY PRODUCTION

TECHNOLOGICAL FIELD

The invention relates to a novel solar-based system for energy production.

BACKGROUND ART

References considered to be relevant as background to the presently disclosed subject matter are listed below:
  US patent application No. US 2016/251767
  US patent application No. US 2016/222948
  US patent application No. US 2014/123646
  US patent application No. US 2011/108435
  US patent application No. US 2012/060418
  US patent application No. US 2013/229018
  PCT application No. WO14064673
  *Using concrete and other solid storage media in thermal energy storage (TES) systems* D. Laing, S. Zunft Esslingen University of Applied Sciences, Germany, formerly of German Aerospace Center (DLR), Germany; German Aerospace Center (DLR), Advances in Thermal Energy Storage Systems, p 65-86
  http://www.wilsonsolarpower.com/

Acknowledgement of the above references herein is not to be inferred as meaning that these are in any way relevant to the patentability of the presently disclosed subject matter.

BACKGROUND

Solar energy is, by nature, an intermittent energy source, whereas electricity, or heat, derived from it, must usually be supplied per consumer's demand, often around the clock (24/7, 365 days a year). To enable supply per demand, some or all of the energy produced by a solar facility, in the form of heat or electricity, must be stored. Many of the existing solar systems are not equipped with storage means. Others have storage capabilities, for various periods of time, which significantly add to the cost of energy produced by the system.

Both the lack of storage means, and the high costs associated with energy storage, limit the utilization of solar energy and prevent it from becoming a principal source of energy consumed by human civilization.

GENERAL DESCRIPTION

The invention relates to the utilization of solar energy for generation of electricity and/or production of clean fuels or other chemicals, as a means for long term, transportable storage of inherently intermittent solar energy.

The proposed novel solar-based system is configured for continuous energy production and provides per-demand electricity.

This novel system enables the ability to keep the same system configuration for a large range of electricity demand, from on-demand baseload electricity 24/7, year-round, to 5-10 hours a day, during the peak demand for power. Moreover, this configuration can be combined with additional elements, enabling it to be used for fuels and other chemicals produced via chemical reactions, or alternating between fuel production and power generation. The compact modular system configuration enables a significantly shorter length of heat-transporting pipes, relative to other solar systems, and therefore increases efficiency and reduces costs. This novel system combines a highly efficient solar energy conversion with storage of thermal energy that does not add to the specific system cost (i.e. the $/kWh).

According to one broad aspect of the present invention there is provided an energy generation system comprising a solar energy collection arrangement configured and operable for collecting and reflecting concentrated sunlight radiation; a solar energy receiver configured for receiving the concentrated sunlight radiation from the solar energy collection arrangement and converting the concentrated sunlight radiation to thermal energy in a first working fluid; a thermal energy storage unit comprising at least one thermal energy storage module being configured and operable for storing thermal energy; a charging piping arrangement connecting between the solar receiver to the thermal energy storage unit and being configured and operable for carrying a first working fluid transferring heat from the solar receiver to the at least one thermal energy storage module, to thereby enable charging the at least one thermal energy storage module with thermal energy, and carrying the first working fluid back to the solar receiver, after the first working fluid exits the thermal energy storage unit; a power conversion unit configured and operable for accommodating a second working fluid and converting heat delivered by the second working fluid to electricity; and a heat discharging piping arrangement connecting between the thermal energy storage unit to the power conversion unit and being configured and operable for carrying the second working fluid for transferring heat from the at least one thermal energy storage module to the power conversion unit, and carrying the second working fluid back to the at least one thermal energy storage module, after the second working fluid exits the power conversion unit.

In some embodiments, the thermal energy storage unit comprises a plurality of thermal energy storage modules connected to one another via an arrangement of pipes accommodating at least one of the first and the second working fluids.

In some embodiments, at least one of the thermal energy storage modules contains both sensible heat and phase-change materials (PCM), for increasing storage capacity.

In some embodiments, the system comprises a novel thermal energy storage unit comprising at least one storage module having a heat storage material, e.g. packed bed, and a first arrangement of pipes through which a charging fluid (i.e. working fluid) passes, and a second arrangement of pipes through which discharging fluid (i.e. a different working fluid) passes, such that the same storage tank comprises charging and discharging fluids enclosed in the same volume. The charging and discharging fluids can therefore flow simultaneously, or each one by itself, independent of the other fluid. In this connection it should be noted that the charging/discharging pipes arrangement may be implemented as part of the thermal energy storage unit being accommodated within the housing of the thermal energy storage modules, or may be implemented as a part of the energy production system connecting between the thermal energy storage unit and the solar receiver/the power conversion unit.

The novel thermal energy storage unit is configured to store thermal energy provided by an intermittent source as sensible and latent heat, while supplying heat in a stable and controlled rate to the power conversion unit, per its requirement, regardless of the intermittent nature of the energy source.

This novel thermal energy storage unit can be a part of any energy production system for fuel and/or electricity production. In both cases, it can operate around the clock, or per consumer's demand.

In some embodiments, the thermal energy storage unit is directly connected to a solar energy receiver and located very close thereto, e.g. the receiver is mounted on the thermal energy storage unit.

In some embodiments, the solar receiver comprises a chimney configured for channeling heat flow generated by natural convection heat losses from the solar receiver.

In some embodiments, the solar receiver comprises at least one thermoelectric array being configured and operable to absorb the heat flow and use the heat flow to produce electricity.

In some embodiments, the system further comprises a cooling module configured for utilizing the heat flow to produce chilled water. The chilled water may be used for cooling the second working fluid of the power conversion unit before it is compressed.

In some embodiments, at least a part of the arrangement of pipes of the at least one of the thermal energy storage modules has at least one of a slanted pipe section and a U shape, to thereby reduce piping length.

In some embodiments, the system further comprises at least one of one or more heat exchangers and one or more additional thermal energy storage modules being in fluid communication with the thermal energy storage unit and the power conversion unit, and being configured for receiving heat from the thermal energy storage unit and for supplying heat to the power conversion unit. The splitting of the heat exchanger or additional thermal energy storage unit into a plurality of units reduces the pressure difference across the heat-transferring walls, e.g. the walls dividing the hotter and colder fluids inside the heat exchanger, or pipe walls inside a storage-like container. This also reduces the cost of the high temperature heat exchanger/thermal energy storage module configuration and increases its durability and longevity.

In some embodiments, the system further comprises an intermediate arrangement of pipes connecting between at least two of the following components: the thermal energy storage unit, one or more heat exchangers and the one or more additional thermal energy storage modules. In other words, the intermediate arrangement of pipes may connect between the thermal energy storage unit and the intermediate components as well as between two heat exchangers or two additional thermal energy storage modules. The intermediate arrangement of pipes may be configured for accommodating at least one intermediate working fluid being in some cases at an intermediate pressure between the pressure of the thermal energy storage unit and that of the PCU. The third working fluid can be used for transferring heat from the at least one thermal energy storage module to at least one of the heat exchanger and the additional thermal energy storage unit, and/or from one heat exchanger or additional thermal module to another heat exchanger or additional thermal module.

In some embodiments, at least a portion of the charging piping arrangement is configured for carrying the first working fluid back to the solar receiver. In some non-limiting cases at least one of the pipes carrying the first working fluid back to the receiver, after it exits the thermal energy storage unit, is located inside at least one of the thermal energy storage modules or within an insulation portion of the thermal energy storage unit.

In some embodiments, at least a portion of the charging piping arrangement or of the heat discharging piping arrangement is accommodated within the insulation portion of the thermal energy storage unit.

In some embodiments, the system further comprises a fuel combustor located upstream or downstream of the thermal energy storage unit and is configured for heating the first working fluid or the second working fluid, respectively.

In some embodiments, the power conversion unit comprises a multi-stages turbine and the discharging piping arrangement is configured such that the second working fluid bypasses a first turbine stage and is introduced into a second turbine stage.

In some embodiments, at least one pipe of the charging piping arrangement transferring heat from the solar receiver to the thermal energy storage unit is placed inside another pipe of the charging piping arrangement, carrying the first working fluid back from the thermal energy storage unit to the solar receiver, forming an annulus configuration.

In some embodiments the system further comprises a chemical reactor for clean fuel production. The chemical reactor may be in electrical communication with the power conversion unit and/or in fluid communication with the thermal energy storage unit. The chemical reactor may be configured and operable for converting reactants to products by chemical reactions and by utilizing either one or both, the heat from the thermal energy storage unit, and the electricity generated by the power conversion unit. It should be understood that generally, in solar fuel production systems, fuel production takes place only during sunlight hours; in other words, the production of fuel is the sole method of solar energy storage. The novel configuration of the system of the present invention enables to provide thermal energy and perform chemical conversion around the clock. The present invention also enables the generation of electricity or fuel, or both, depending on sunlight radiation and on the needs of the user.

In some embodiments, the electricity produced by the power conversion unit is used for fuel production.

It should be noted that the reactant and product fluids are stored at room temperature. Typical reactants are water and $CO_2$; typical products are $CO$, $H_2$ and $O_2$. Commonly, the $O_2$ is separated from the $CO$, $H_2$ during the process. The mixture of $CO$ and $H_2$, called syngas, is commonly used to produce other fuels or useful chemicals such as methanol, gasoline, diesel, olefins, etc. The reaction products can also be used directly for combustion in a combustor whenever it is desired.

In some embodiments, the chemical reactor is configured for using at least a part of the electricity generated by the power conversion unit.

In some embodiments, the system further comprises a switch connection configured for alternating between electricity production and fuel production and for controlling their respective quantities.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which.

DETAILED DESCRIPTION OF EMBODIMENTS

Figure 1A:
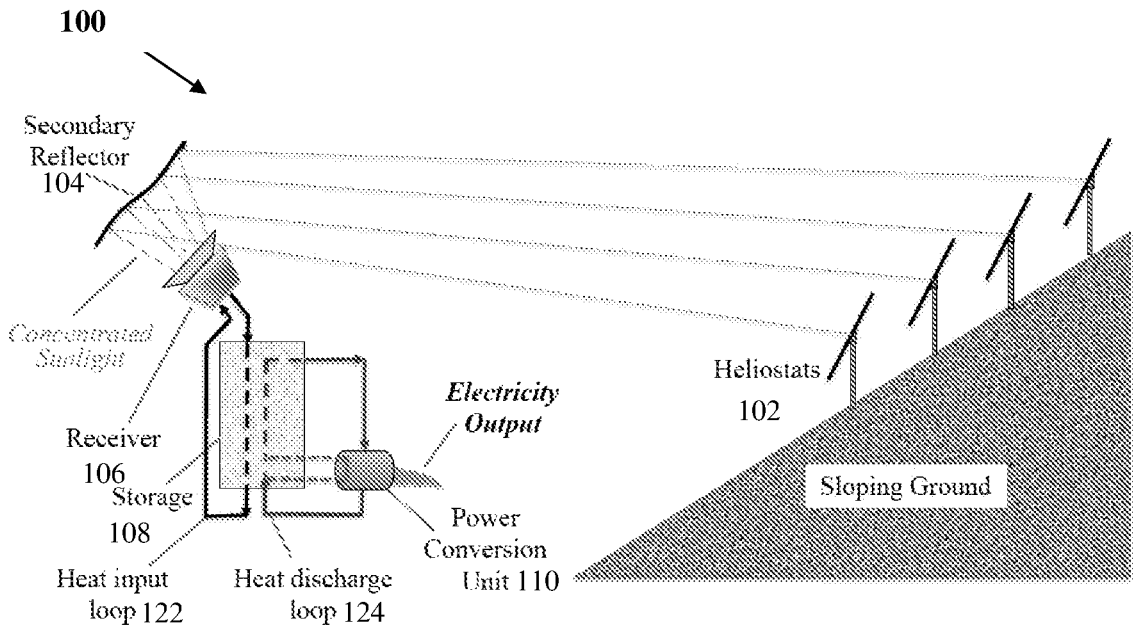
FIGS. 1A-1C are examples of a possible system configuration for generation of solar-electric power around the clock, or per demand.

Reference is made to FIG. 1A representing a novel configuration of an energy generation system for generation of solar-electric power around the clock, or per demand. The system 100 comprises a solar energy collection arrangement 102 illustrated in the figure as a field of heliostats positioned on a sloping ground and being configured and operable for collecting and reflecting concentrated sunlight radiation; a solar energy receiver 106 configured for receiving the concentrated sunlight radiation from solar energy collection arrangement 102 or from an optional secondary reflector 104 for additional concentration of sunlight radiation. Solar energy receiver 106 is also configured for converting solar radiation to thermal energy in a working fluid, which transports the thermal energy to a Thermal Energy Storage (TES) unit 108. The TES unit 108 comprises one or a plurality of thermal energy storage modules being connected via an arrangement of charging pipes (i.e. heat charging loop 122) to the solar receiver 106. The TES unit 108 is configured for storing thermal energy and comprises an arrangement of heat storage material and pipes. The heat charging loop 122 comprises an arrangement of pipes connecting between the solar receiver 106 to the TES unit 108 and is configured for accommodating a first working fluid heated by the solar receiver 106 and for transferring heat from the solar receiver 106 to the TES unit 108. The system 100 also comprises a Power Conversion Unit (PCU) 110 connected to the TES unit 108 via an arrangement of pipes (i.e. heat discharging loop 124) accommodating a second working fluid. The PCU 110 is configured and operable for receiving the second working fluid and converting heat transferred thereto from the TES unit 108 into electrical power. Heat discharging loop 124 comprises an arrangement of pipes configured for accommodating a second working fluid for transferring heat from the TES unit 108 to the PCU 110. The first and second working fluids may be of the same substance (e.g. air) or of substances having different chemical compositions (e.g. air and $CO_2$), and may operate at the same pressure or at different pressures.

The solar energy collection arrangement 102 may comprise any suitable means for concentrating solar radiation, for example using a sun-tracking concentrator, such as a dish-concentrator, or an array of heliostats. In the examples shown in FIGS. 1A and 2A, the sun-tracking concentrator is an array of heliostats. However, the present invention is not limited to any specific configuration. The solar energy collection arrangement 102 is configured for achieving sufficiently high optical efficiency at the required concentration ratio (e.g. about 1000×). The solar energy collection arrangement 102 is configured for maximizing the annual optical efficiency, i.e. maximizing the portion of the solar radiation reaching the reflector surfaces (heliostats) that enters the receiver 106 over one year.

The solar receiver 106 may be, but is not limited to, the solar receiver described in U.S. Pat. No. 8,960,184 assigned to the assignee of the present patent application. The solar receiver 106 is configured to maximize the radiation energy from the concentrated sunlight that is absorbed by the heat-charging loop 122 (i.e. heat-charging working fluid) and minimize energy losses. Solar receiver 106 may be any suitable solar receiver designated to transfer heat from concentrated solar radiation to a working fluid. The solar radiation may be concentrated in any suitable solar energy collection arrangement.

The TES unit 108 is configured for being operable at a relatively high-temperature (400° C.-1000° C.) and for having a sufficient range between the upper and lower temperatures ($\Delta T > 300°$ C.) to reach high overall efficiency of the system. It can operate around the clock, or per customer's demand.

The PCU 110 may comprise, in a specific and non-limiting example, a supercritical $CO_2$ ($sCO_2$) turbomachinery engine using turbine, generator, compressor, recuperator, etc. This specific and non-limiting example is illustrated in FIGS. 5C-5D. Typically, a working fluid, such as air, steam, $CO_2$ or another gas, is compressed and heated before being supplied to the turbine, wherein the working fluid is expanded and some of the energy content of hot, compressed working fluid is converted to mechanical work which is then converted to electricity by use of a generator. The turbine is configured to receive the second working fluid exiting the thermal energy storage unit. In a specific and non-limiting example, the heated second working fluid is introduced into a turbine, which drives an electrical generator via a shaft. At least one recuperator (i.e. a heat exchanger for recuperating unused thermal energy) may be provided for heating compressed working fluid flowing out of a compressor with the expanded working fluid flowing out of the turbine. The PCU 110 is selected to provide a high efficiency (>50%) and is configured to operate at relatively high pressures. Typical higher and lower upper pressures of supercritical $CO_2$ ($sCO_2$) turbomachinery are 250 and 80 bar, respectively (i.e. pressure ratio of 3.125). In general, increasing the pressure ratio and/or the upper temperature increase the PCU efficiency. The components are designed to maximize the overall system efficiency and minimize the Levelized Energy Cost (LEC) of the whole system.

In some embodiments, system 100 may comprise an optional optical component 104 for additional concentration of sunlight radiation. The secondary optical component 104 may be a secondary reflector to be used if the system analysis shows that it would reduce the levelized energy cost (LEC) of the system. The secondary reflector 104 is configured to increase the concentration of sunlight radiation before the concentrated solar radiation enters the solar receiver 106.

It should be understood that the system 100 of the present invention is configured for minimizing thermal and pressure losses from the working fluid during its transmission. To this end, the system 100 comprises a heat-charging loop 122 for transferring heat from the solar receiver 106 to the TES unit 108 and a heat discharging loop 124 for transferring heat from the TES unit 108 to the PCU 110. The working fluids flow at high temperatures and pressure.

Table 1 below lists typical operating temperatures and pressures of the heat charging and discharging loops 122 and 124, respectively, as shown in FIG. 1A:

TABLE 1

System operating condition ranges

| | Working fluid loop | | | |
|---|---|---|---|---|
| | 122 | | 124 | |
| Piping section | Receiver to TES | TES to Receiver | TES to PCU | PCU to TES |
| Temperature (° C.) | 750-1000 | 400-600 | 700-900 | 350-550 |
| Pressure (Bar) | 1-10 | 1-10 | 200-300 | 200-300 |

Figure 1B:
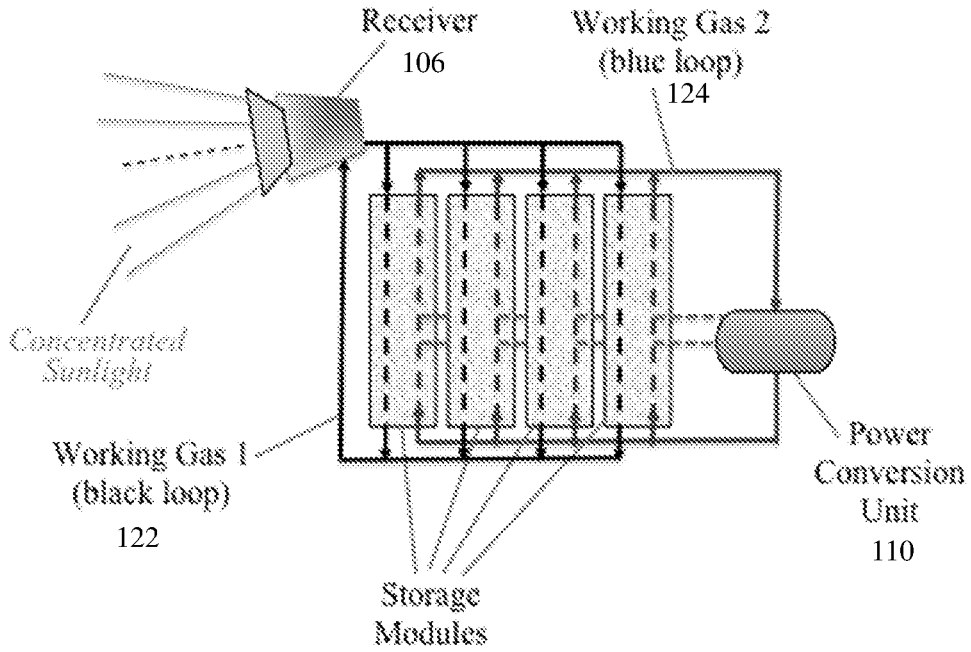

FIG. 1B shows an enlarged partial view of the system configuration of FIG. 1A in which the thermal energy storage unit 108 is divided to a plurality of interconnected thermal energy storage modules 108A. This configuration enables flexibility in the storage and overall system operation. Each thermal energy storage module may comprise a sensible heat storage material such as molten salt, organic heat transfer fluid, steam, packed bed (i.e. high heat capacity solid materials), or phase change materials. A single storage module may have a combination of these materials. For example, packed bed materials storing sensible heat may be used in combination with phase change materials storing latent heat. It is noted that the thermal energy storage module may comprise any suitable means for providing thermal energy storage.

Figure 1C:
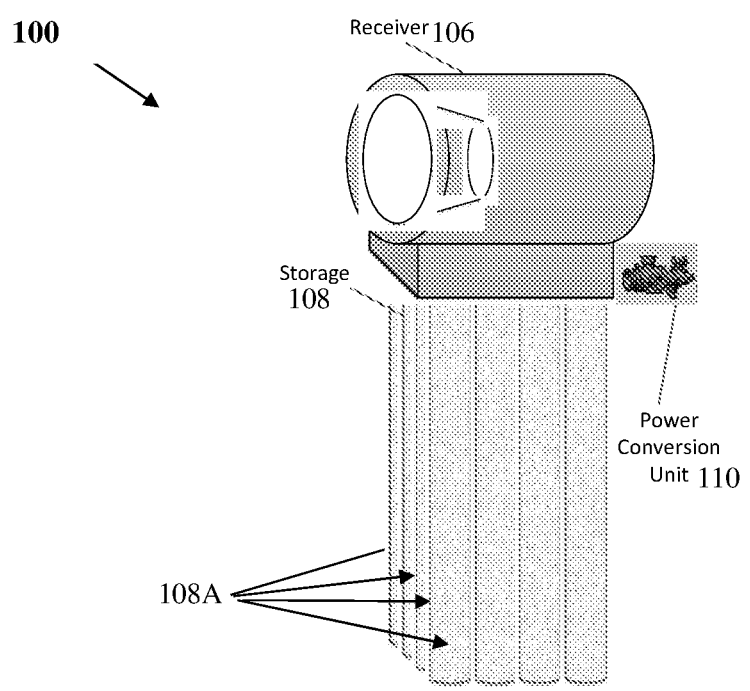

Reference is made to FIG. 1C, schematically illustrating an embodiment of the present invention in which the thermal energy storage unit 108 is directly connected to a solar energy receiver 106 and located very close thereto, e.g. the receiver is mounted on the thermal energy storage module. In this specific and non-limiting example, the thermal energy storage unit 108 comprises a plurality of storage modules 108A configured as vertical tubes, whose typical aspect ratio, (i.e. the ratio between the tube's length and its diameter) is larger than 10 and smaller than 30. The solar receiver 106 is placed on top of the tubular storage modules 108A. This configuration has several advantages: (i) the tubular storage modules 108A of TES unit 108 effectively eliminate the need for the tower structure, which is otherwise required to elevate the receiver; (ii) the length of the heat-charging pipes, which transfer hot working fluid from the receiver 106 to the TES's modules 108 is minimized; (iii) the Power Conversion Unit (PCU) 110 and optionally adjoining heat exchangers can also be placed on top of the TES's modules 108A, such that the length of the pipes, which discharge heat from the TES's modules 108A to heat exchanger upstream of the PCU 110 is minimized. The figure shows schematically how the storage charging/discharging piping arrangement, the receiver and the other system elements can be integrated together to eliminate the need for a specifically designated tower. The elements can be integrated together to form a system producing heat or electricity.

In this connection, it should be noted that in existing Solar Central Receiver (SCR) systems, the receiver is typically mounted on a steel or concrete tower, while the storage tanks (if any) are placed on the ground near the base of the tower, such that their vertical dimension is much shorter than the tower's height up to the receiver's location near the tower's top. Usually an SCR system has a field of heliostats, focusing sunlight onto the aperture of a receiver located near the top of the tower. The receiver commonly converts the radiation energy to thermal energy in a working fluid. Elevating the receiver above ground level is necessary to diminish the shading of the reflected light from a given heliostat by neighboring heliostats. The height of the tower can be between 30 and over 200 m, depending on the system size and design, and it is typically a significant cost item.

Figure 2A:
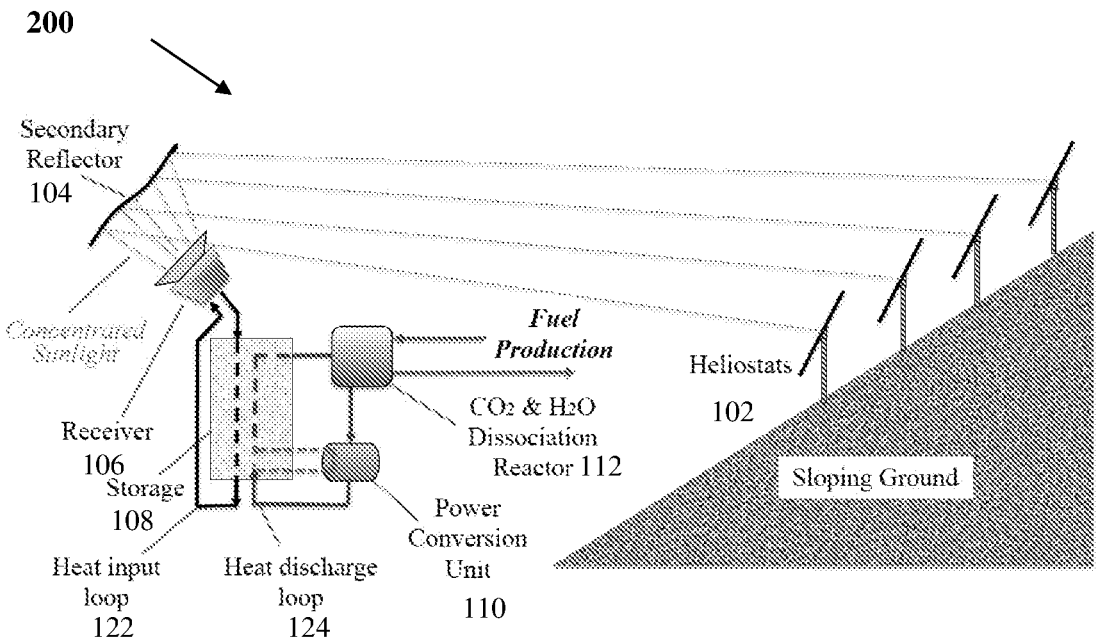
FIGS. 2A-2C are examples of a possible system configuration for solar-driven fuel production around the clock, or per demand.

Reference is made to FIG. 2A representing another possible configuration of a system for solar-driven fuel production around the clock, or per demand. The system 200 comprises a solar energy collection arrangement 102, a solar receiver 106, a TES unit 108, a heat charging loop 122, a PCU 110, a heat discharging loop 124, an optional secondary optical component 104 and a chemical reactor 112 which may be energized by the power conversion unit 110 being in fluid communication with the TES unit 108. Chemical reactor 112 is configured and operable for production of synthetic gas, or other fuel or chemicals, by utilizing either one or both, the heat from TES unit 108, and the electricity generated by the PCU 110. In a specific and non-limiting example, the system of FIG. 1 can therefore be modified for syngas production from $CO_2$ and water by the addition of chemical reactor 112. In this connection, it should be noted that all the examples shown below can be implemented with or without a chemical reactor, for either fuel or electricity production. The system 100 can be used for electrical power generation around the clock, or per demand. By adding a chemical reactor 112, system 100 is converted to system 200, which can be used around the clock, for either solar-driven fuel production, or electricity generation. Chemical reactor 112 may perform the dissociation of $CO_2$ and $H_2O$ to CO, $H_2$ and $O_2$, being configured and operable to receive heat from the TES unit 108 via the heat discharging loop 124. The chemical reactor 112 may be, but is not limited to the chemical reactor described in U.S. Pat. No. 8,268,138 assigned to the assignee of the present patent application.

Figure 2B:
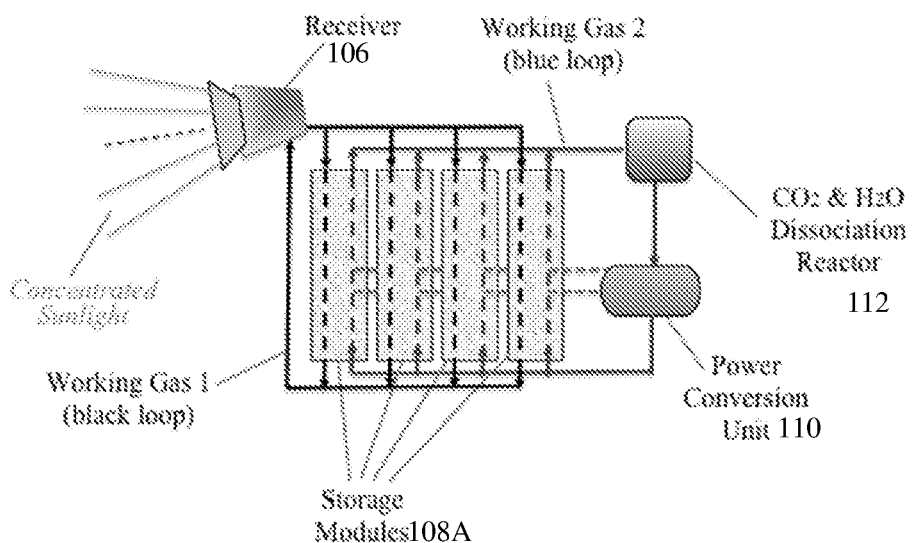

FIG. 2B shows an enlarged partial view of the system configuration of FIG. 2A in which the thermal energy storage unit 108 is divided into a plurality of interconnected thermal energy storage modules 108A. This configuration enables flexibility in the storage and overall system operation.

Figure 2C:
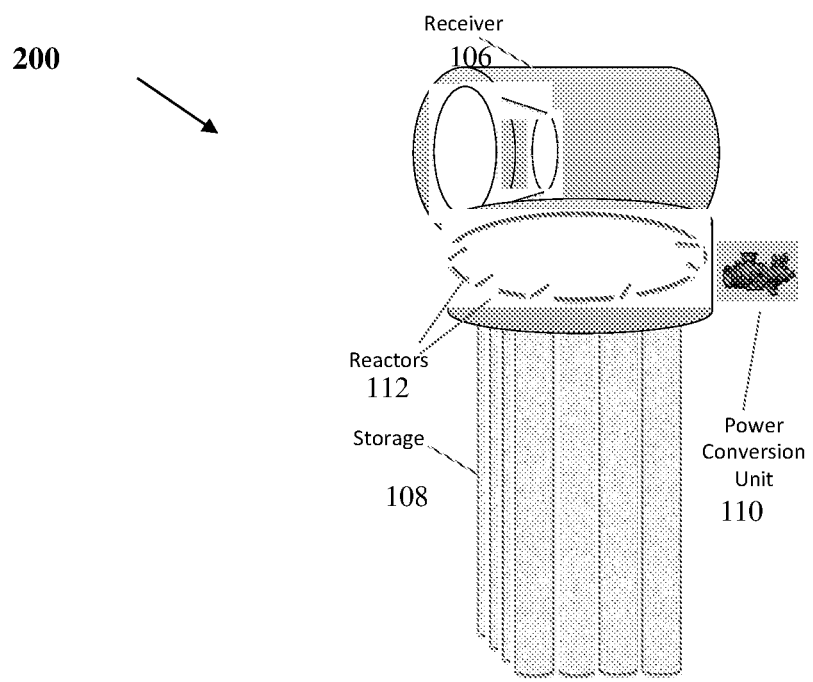

Reference is made to FIG. 2C, illustrating an embodiment of the present invention, in which the thermal energy storage unit 108 is directly connected to a solar energy receiver 106 and located very close thereto, e.g. the receiver is mounted on the thermal energy storage unit. FIG. 2B shows schematically how the different elements of the system can be configured together with the reactor(s) 112 to produce a chemical reaction. In addition to the advantages discussed in connection with FIG. 1B, the configuration shown in FIG. 2B also enables minimization of the length of the pipes using the working fluid in loop 124 to provide heat to reactor 112.

Figure 3A:
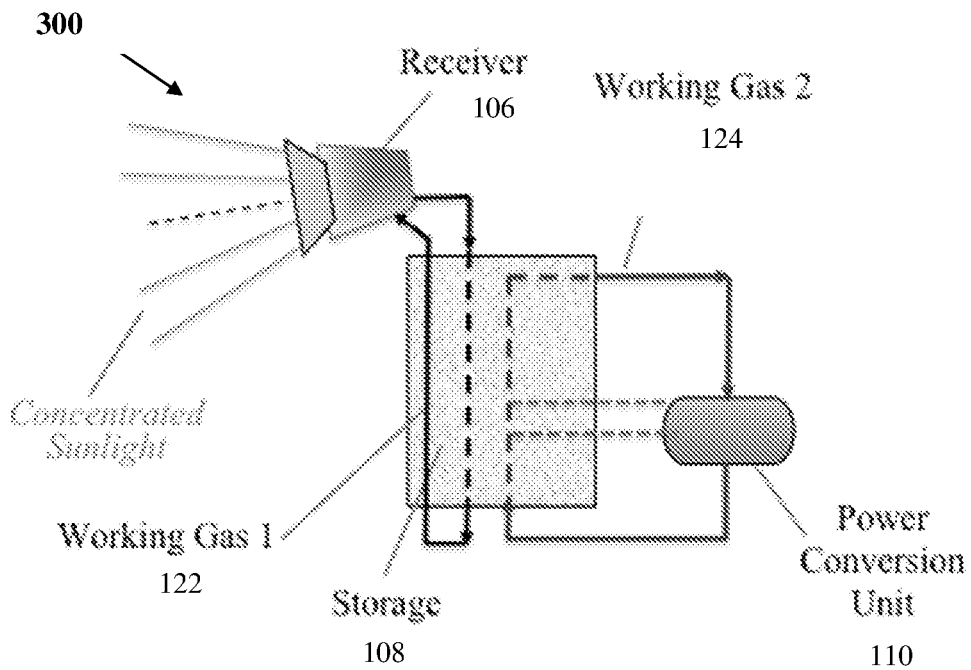
FIGS. 3A-3B are partial views of different possible configurations of the system of the present invention according to some embodiments of the present invention.

FIG. 3A shows a partially enlarged view of one possible configuration of the system 300 of the present invention in which at least one section of the heat charging loop 122, returning from the TES unit 108 to receiver 106, is inserted into the insulation of TES unit 108. This configuration enables reduction of heat losses and an increase of the efficiency of the system. It is noted that each thermal energy storage module may comprise a housing, a thermal insulation and an arrangement of heat storage material and pipes. Therefore, a section of the heat charging loop 122 can be inserted within the insulation portion of the thermal energy storage unit i.e. the insulation of a thermal energy storage module (e.g. inside the module's housing), or in the insulation between modules.

Figure 3B:
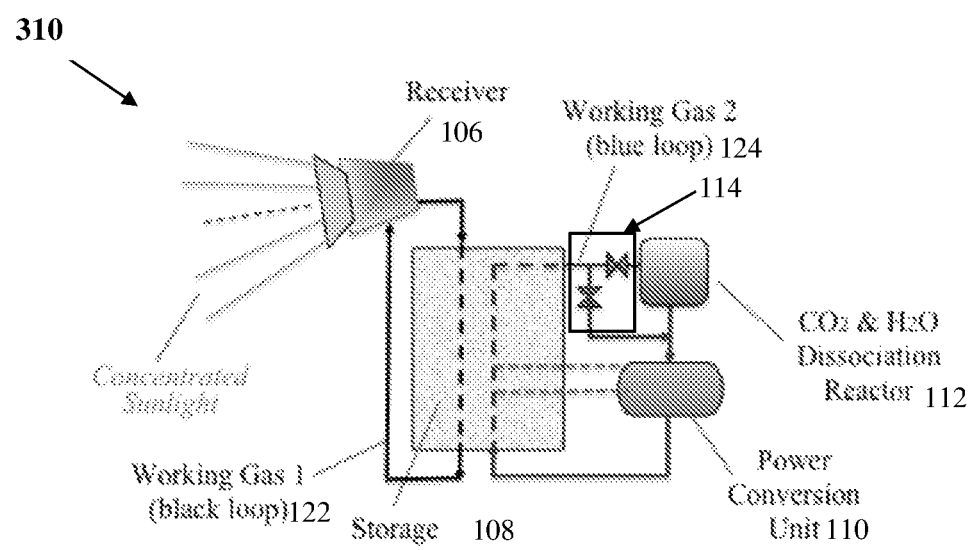

FIG. 3B shows a schematic illustration of system 310 according to one embodiment of the present invention in which the second working fluid in loop 124 flows either through or around the reactor 112. As schematically shown in FIG. 3B, this system configuration enables alternate use, for either fuel or electricity production. It should be noted that at any given time, all or part of the electricity generated by power conversion unit 110 is used in chemical reactor 112 and/or all or part of the electricity is dispatched to one or a plurality of electricity consumers. To this end, system 310 comprises a switch connection 114 (e.g. valves arrangement) configured for alternating between electricity production and fuel production. This configuration enables the production of both electricity and fuel. This can be useful, for example, when electricity demand is lower than what the system can produce, e.g. during the long summer days.

Figure 4A:
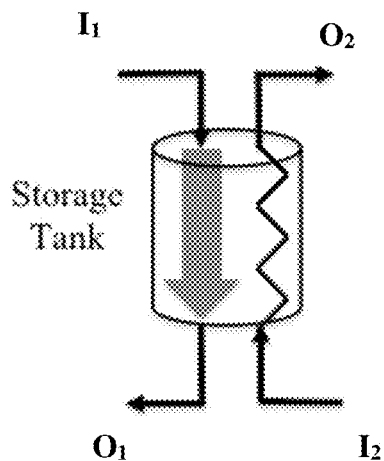
FIG. 4A shows a possible configuration of a thermal energy storage module according to some embodiments of the present invention.

Reference is made to FIG. 4A representing a schematic view of a thermal energy storage module 408 of the present invention in which the charging and the discharging are independent. In this specific and non-limiting example, the charging fluid flows in a packed bed, i.e. the fluid is in direct contact with the elements (e.g. pebbles), which make up the packed bed. The discharging fluid flows inside pipes installed in the same packed bed. The charging and discharging fluids can flow simultaneously, or each one by itself, independent of the other. This novel configuration of the thermal energy storage module 408 enables using different fluids, having the same or different pressure for the charging and discharging, respectively, of thermal energy in one enclosed volume. The thermal energy storage module 408 may comprise two inlet pipes $I_1$ and $I_2$ placed at opposite sides of the storage module for introducing charging and discharging fluids, and two outlet pipes $O_1$ and $O_2$ also placed at opposite sides of the thermal energy storage module for removing charging and discharging fluids. It should be noted that each thermal energy storage unit may comprise at least one thermal energy storage module configured according to module 408. This configuration of the thermal energy storage module can be implemented in any energy production system, as described herewithin or as known in the art, with or without a chemical reactor.

It should also be noted that the thermal energy storage modules 108A and 408 are generally configured as heat exchangers.

Figure 4B:
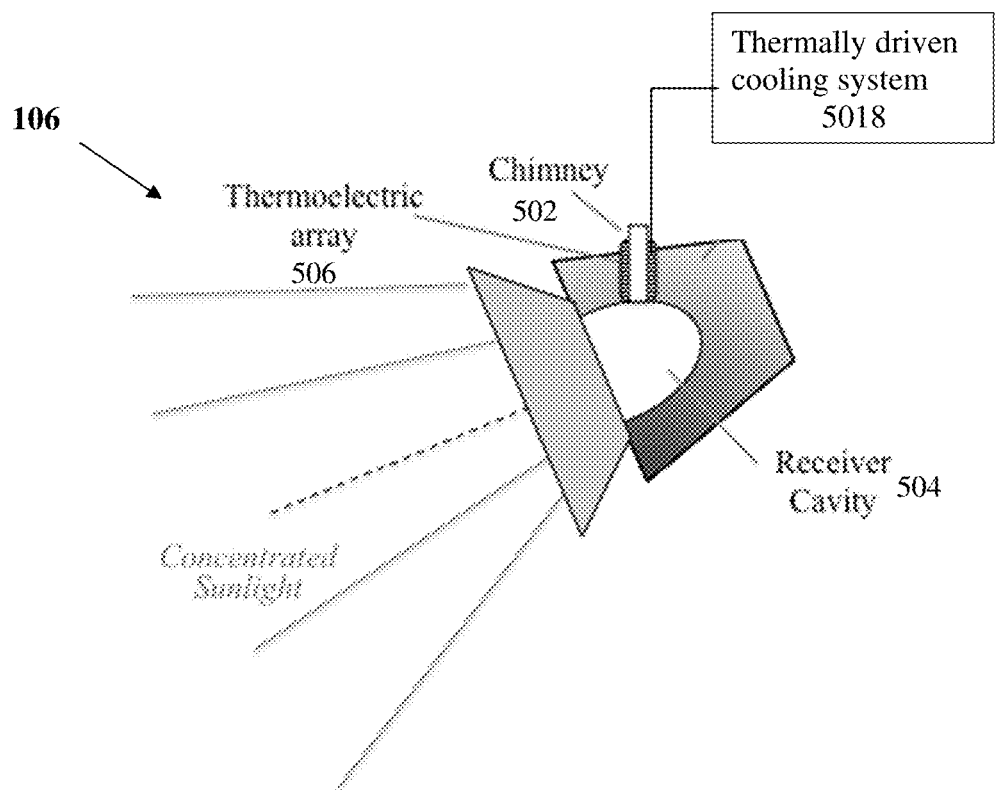
FIG. 4B shows a possible configuration of a solar receiver including a chimney according to some embodiments of the present invention.

Reference is made to FIG. 4B representing a partial schematic view of the solar receiver 106 according to some embodiments of the present invention, comprising inter alia a chimney 502, which enables fluid flow between the receiver's cavity 504 and the outside ambient air. The chimney 502 is configured for channeling a hot flow generated by natural convection heat losses from the receiver's cavity 504 to the surrounding air. Heat absorbed in the chimney's wall, or in tubes inserted in the chimney, can be harnessed and used for various applications. Optionally, at least one thermoelectric array 506 may be installed on the walls of the chimney 502, absorbing heat from the flow in the chimney and using it for producing electricity. Another option is to transfer the heat from the chimney flow to another working fluid via a heat exchanger and use this heat for another function in the system, for example using a thermally driven cooling system 5018 to produce chilled water (at about 10-15° C.). The chilled water can be used to cool the low-pressure supercritical $CO_2$ flow in a cooling module (e.g. Water Cooler 518 shown in FIG. 4C), instead of a using a Water Cooler cooled by the ambient air. This configuration reduces the power required for compression and increases the PCU efficiency. The heat from the chimney could be used simultaneously for more than one option. This configuration of the solar receiver can be implemented in any energy production system, as described herewithin or as known in the art, with or without a chemical reactor.

Figure 4C:
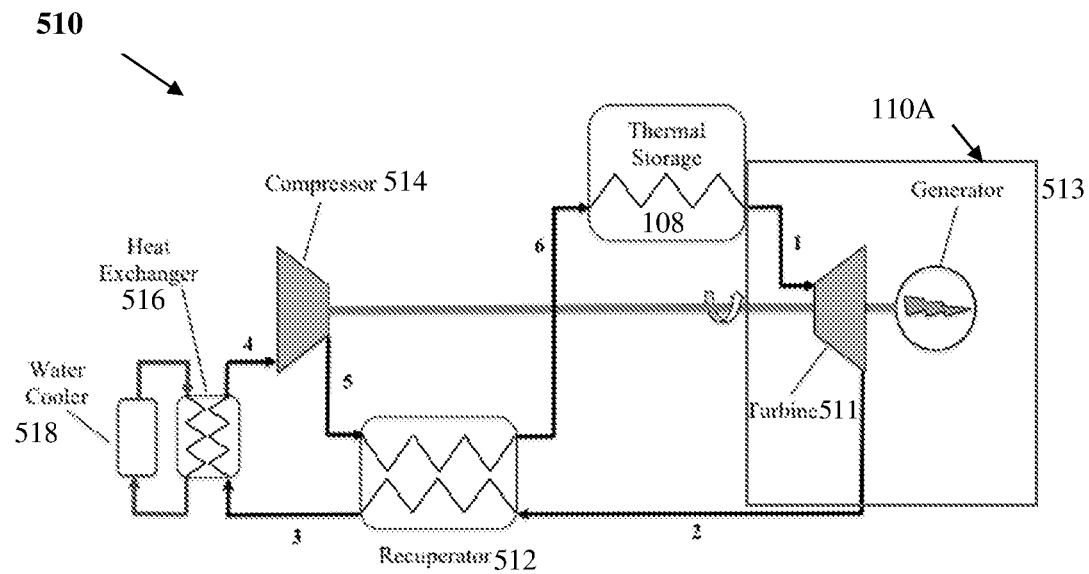
FIGS. 4C-4D are schematic flow diagrams of the power conversion unit and thermal energy storage module according to some embodiments of the present invention.

Reference is made to FIG. 4C representing a schematic view of subsystem 510 comprising a supercritical $CO_2$ ($sCO_2$) PCU 110A and thermal energy storage unit 108, according to some embodiments of the present invention. In this specific and non-limiting configuration, the heat is provided from the thermal energy storage unit 108. The PCU 110A comprises inter alia a turbine 511 and a generator 513 and is configured and operable for receiving a second working fluid and converting heat transferred thereto from thermal energy storage unit 108 into electrical power. Subsystem 510 also comprises recuperator 512 utilizing heat of the exhausted expanded working fluid flowing out of the turbine, before entering a heat exchanger 516, to heat working fluid exiting the compressor 514. The working fluid heated by the chimney flow can be used in a thermally driven cooling method to produce chilled water (at about 10-15° C.) in water cooler 518 before it reaches compressor 514. The chilled water can be used to cool the low-pressure $sCO_2$ flow, downstream of recuperator 512 instead of using a water cooler cooled by the ambient air. This configuration reduces the power required for compression and increases the PCU efficiency. This configuration of the supercritical $CO_2$ (sCO2) PCU and thermal energy storage unit can be implemented in any energy production system, as described herewithin or as known in the art, with or without a chemical reactor.

Figure 4D:
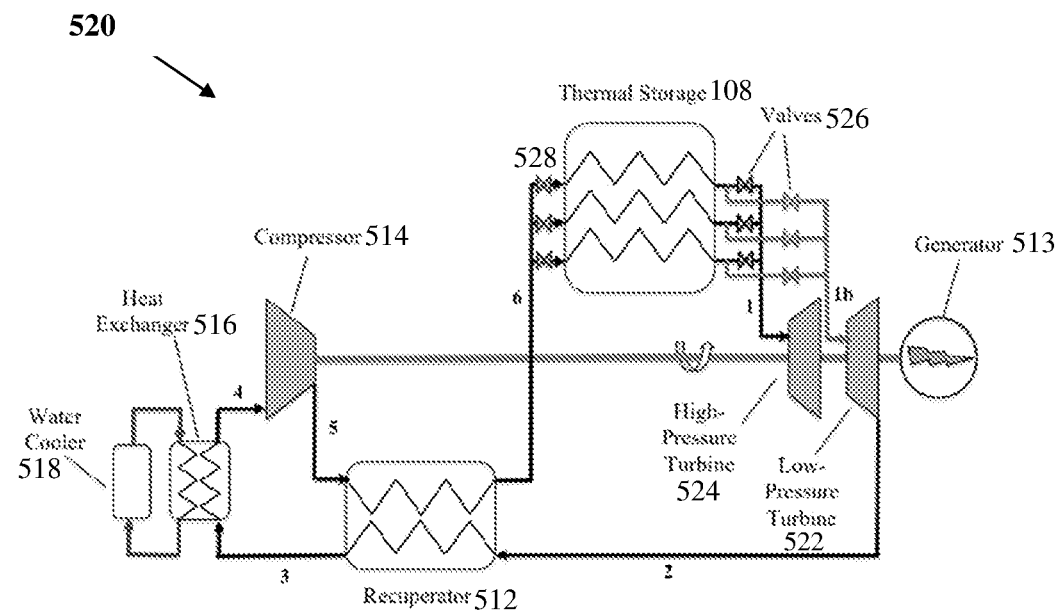

In some embodiments, the pressure in the arrangement of the pipes of loop 124, conveying the second working fluid in the thermal-energy storage unit 108 can be reduced when there is no flow in them (due to flow control requirements) and the storage temperature is relatively high over a large part of the packed bed. This can be done in coordination with the temperature increase in the thermal energy storage module discussed above. In this connection, it should be understood that exposing the pipes conveying the high-pressure second working fluid to high temperature, while there is little or no flow inside them, can cause the pipe's wall temperatures to increase beyond the allowable operating temperature of the pipe's material, at the given pressure of the fluid inside it. The pressure reduction enables to sustain a higher temperature in the arrangement of pipes. This is particularly effective when a two-stage turbine is used, since in that case, the diverted gas can be directed to the second turbine stage where temperature and pressure are lower than in the first stage. In this connection, reference is made to FIG. 4D representing a schematic view of a subsystem 520 according to some embodiments of the present invention. The subsystem 520 differs from subsystem 510 of FIG. 4C in that in this configuration a two-stage turbine 522 (stage 1) and 524 (stage 2) is used. The valves and the additional pipes 526 enable the option of detouring the flow from selected tube(s) as they exit the thermal energy storage unit 108, such that the flow bypasses the high-pressure turbine stage 524 and flows directly into the low-pressure turbine 522. Since the valves 528 upstream of the thermal energy storage unit are partially or fully closed when this option is used, the pressure in the selected tube(s) is reduced upstream of the low-pressure turbine 522, in some or all of the tubes placed inside the thermal energy storage (TES) unit 108 until valves 528 are opened and valves 526 are adjusted for the flow through the selected tube(s) in the thermal energy storage module to go to the high pressure turbine stage 524. This configuration of the supercritical $CO_2$ (sCO2) PCU having a two-stage turbine and of the thermal energy storage unit can be implemented in any energy production system, as described herewithin or as known in the art, with or without a chemical reactor.

Figure 5A:
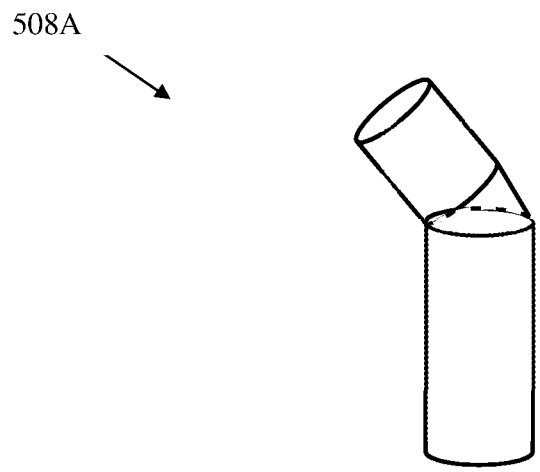
FIG. 5A shows a possible configuration of a thermal energy storage module according to some embodiments of the present invention.

In some embodiments, at least a part of the arrangement of modules 508A of TES unit have a slanted pipe section as illustrated in FIG. 5A, or a U-shape. These thermal energy storage module shapes are configured to reduce the length of the piping conveying the various working fluids to and from them as compared to the piping required if the TES module has a straight cylindrical shape. This configuration of the thermal energy storage module can be implemented in any energy production system, as described herewithin or as known in the art, with or without a chemical reactor.

Figure 5B:
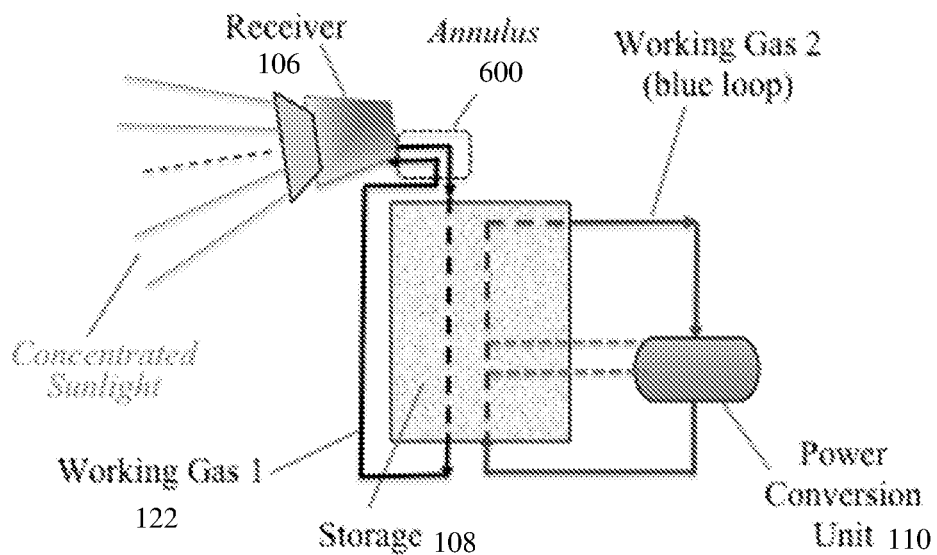
FIG. 5B-5C show possible configurations of a part of the arrangement of pipes according to some embodiments of the present invention.
Figure 5C:
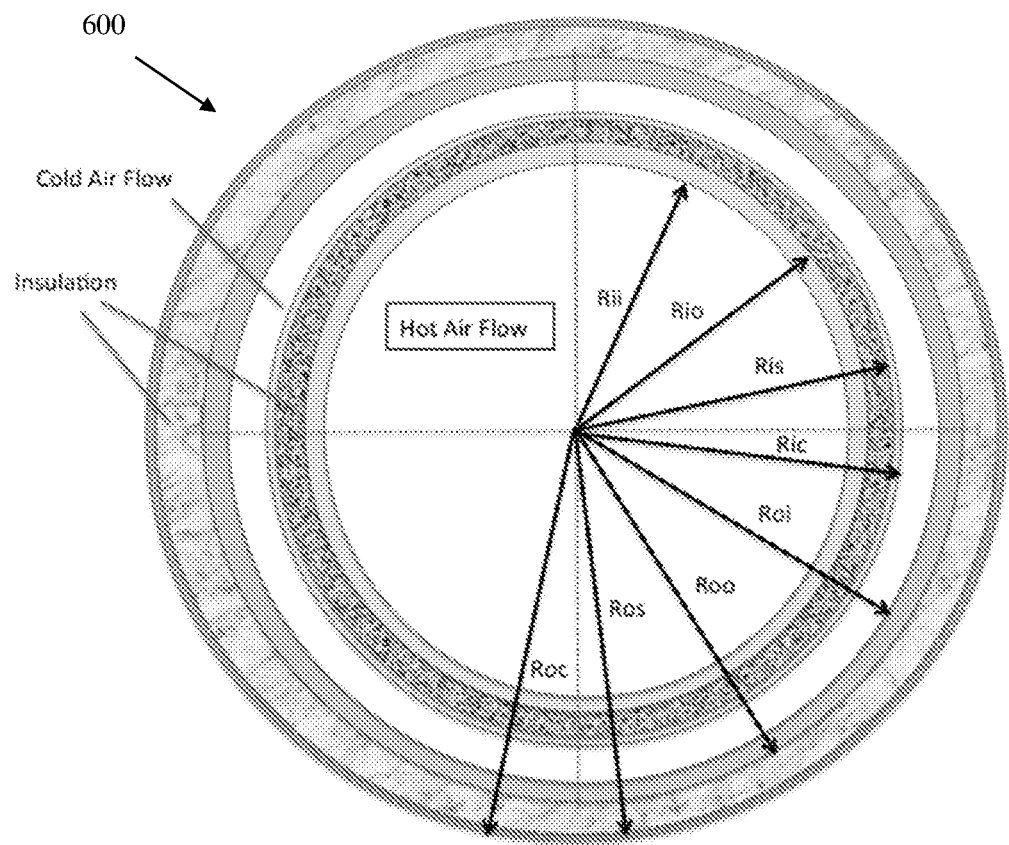
Figure 5D:
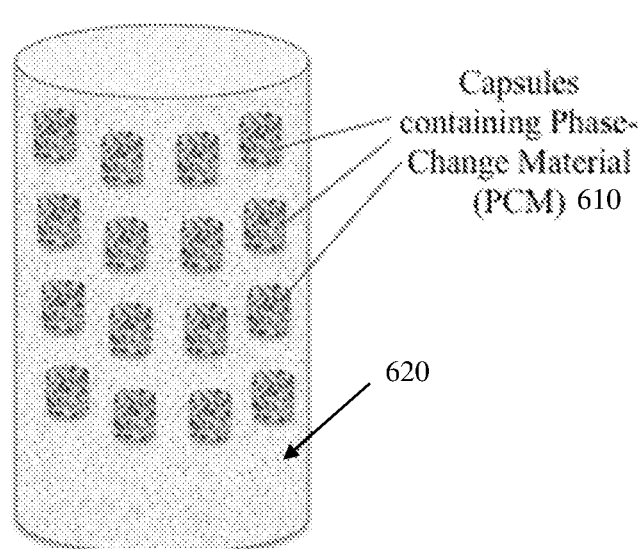
FIG. 5D shows a possible configuration of the thermal energy storage module according to some embodiments of the present invention.

In some embodiments, the arrangement of pipes of the heat-charging loop 122 and/or of the heat-discharging loop 124 may comprise ducts and/or conduits formed with thermal insulation so as to prevent heat losses from the working fluids during their flow. Such pipes may be arranged in a pipe-in-pipe pipeline configuration as known in the art. As an example, in some embodiments, as illustrated in FIG. 5B, a relatively hot pipe section of the arrangement of pipes of the heat charging loop 122 connecting between solar receiver 106 and TES unit 108 can be placed inside another relatively cold pipe of the arrangement of pipes of the heat charging loop 122 connecting back between TES unit 108 and solar receiver 106 creating an annulus configuration 600. This configuration enables reducing heat losses from the hot flow in the piping section from the receiver 106 to the thermal energy storage unit 108. This annulus configuration can be implemented in any energy production system, as described herewithin or as known in the art, with or without a chemical reactor.

FIG. 5C illustrates, as an example, a possible cross-section of an annulus configuration of FIG. 5B configured for reducing heat losses from a hot pipe flow. The terms Rii, Rio, etc. denote the respective inner and outer radiuses of the various annulus pipes.

In some embodiments, the thermal energy storage module comprises capsules containing Phase-Change Material (PCM) for the purpose of storing latent heat and increasing storage capacity. FIG. 5D represents one of the thermal energy storage module 508B containing capsules of Phase-Change Materials (PCM) 610 for storing latent heat, together with a packed bed 620 for storing sensible heat.

Figure 5E:
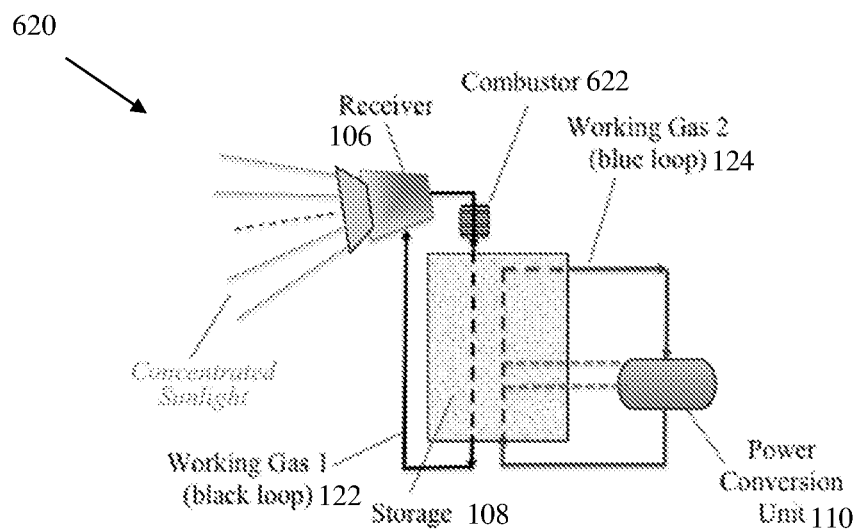
FIG. 5E is a partial view of a possible configuration of the system of the present invention according to some embodiments of the present invention.

In some embodiments, the system comprises an external fuel combustor upstream of the thermal energy storage unit (TES) 108 for heating the working fluid 122 to assure uninterrupted supply of electricity in the case of an extended period (e.g. a few consecutive days) with little or no solar input. This combustion method differs from the common hybridization design used with solar-driven PCU's, where the combustor is a part of the PCU. In this connection, reference is made to FIG. 5E representing a schematic illustration of the system 620 according to some embodiments of the present invention. The system 620 differs from the system 100 of FIG. 1A in that it comprises a combustor 622 located upstream of the thermal energy storage unit 108 on the arrangement of pipes conveying the working fluid of the heat charging loop 122 from the receiver 106 to the thermal energy storage unit 108 and configured for heating the working fluid of the heat charging loop 122 when there is insufficient solar radiation to provide the required heat and assure uninterrupted supply of electricity. Alternatively, a similar combustor could also be placed on the discharging loop 124 (Working Gas 2) downstream of the storage unit 108 and upstream of the PCU 110.

Figure 6A:
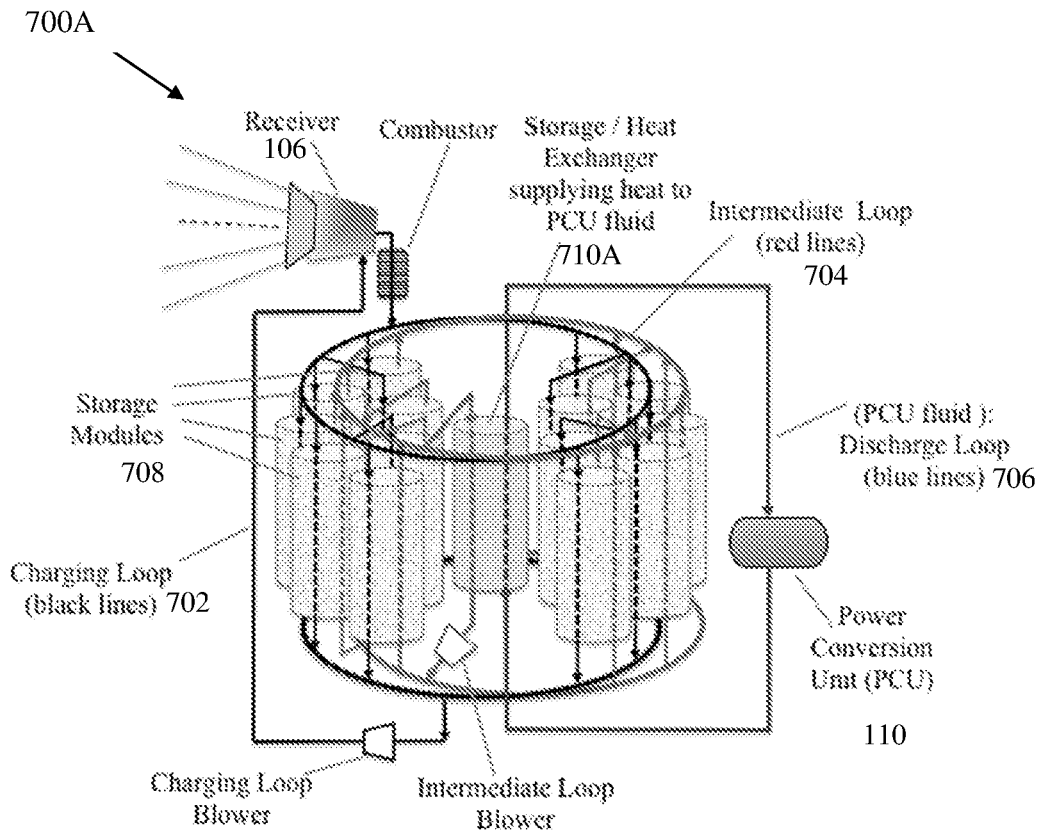
FIGS. 6A-6B show possible configurations of the system according to some embodiments of the present invention.

Reference is made to FIG. 6A schematically showing a partial view of a possible configuration of the system 700A of the present invention. The system 700A is configured for assuring that the high-pressure PCU working fluid is substantially always heated to the specific upper temperature required by the PCU (e.g. 800° C.), regardless of the intermittent input of solar energy and the charged level of the storage. The system 700A is also designed for minimizing the quantity and length of the (expensive) high-pressure/high-temperature piping carrying the PCU working fluid and for enabling significantly larger temperature difference (by 100-200° C.) across the thermal storage than the temperature difference between the turbine inlet temperature and the turbine outlet temperature. This increase in the temperature range of the thermal energy storage enables a storage size reduction, and thus also a cost reduction.

The system 700A comprises inter alia a number of thermal energy storage modules 708 (e.g. between 4 and 24) configured for storing most of the thermal energy delivered by charging loop 702, an intermediate loop 704 and a discharging loop 706. Charging loop 702 comprises a first working fluid (e.g. air) and is configured for charging the thermal energy storage modules 708 with heat from the solar receiver 106. It operates at a relatively low pressure (e.g. 1-10 $Bar_a$). Intermediate loop 704 comprises another working fluid (e.g. air) and is configured for transferring the heat from the thermal energy storage modules 708 to a heat exchanger or a thermal storage unit 710A, which supplies heat to the PCU 110 using the working fluid in loop 706. As known in the art, the heat exchanger may be configured to comprise two compartments for carrying the working fluids separated by a heat-transferring wall. The intermediate loop 704 can use the same kind of fluid (e.g. air) and operates at the same, or similar, pressure as that of the first working fluid, in the charging loop 702.

In some embodiments, at least some of the pipes of charging loop 702 and/or intermediate loop 704 extend into and are accommodated within at least some of the thermal energy storage modules 708. This enables simultaneous charge/discharge. Alternatively, the working fluid flows directly within the storage material (e.g. packed bed). In this case, alternating charge and discharge modes are provided.

Figure 6B:
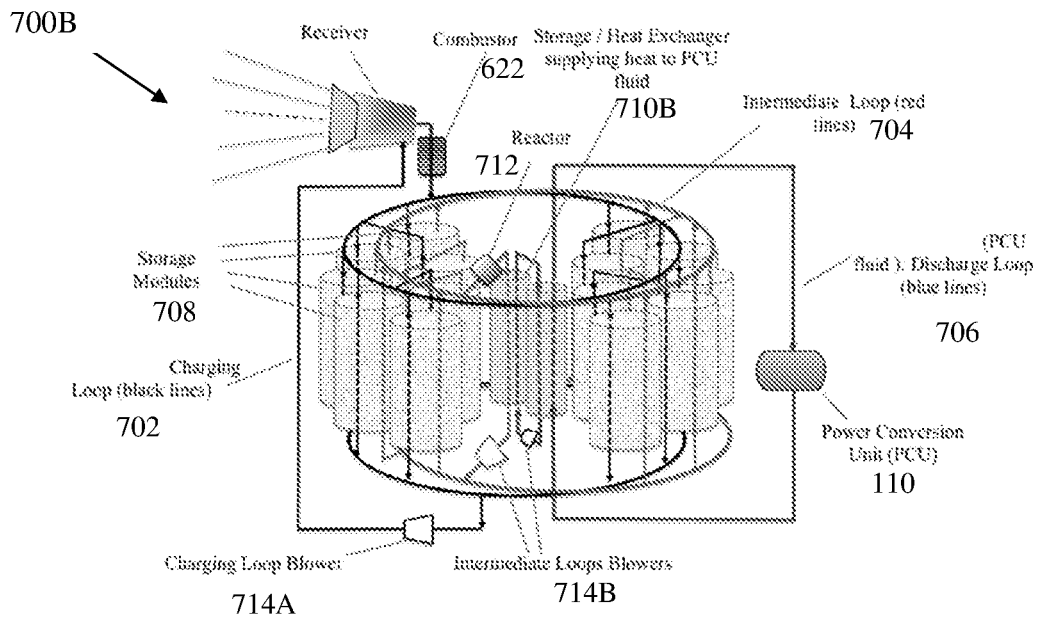

Reference is made to FIG. 6B schematically showing a partial view of a possible configuration of the system 700B of the present invention. In some embodiments the second working fluid, in discharging loop 706, comprises $CO_2$ at a relatively high-pressure (e.g. 100-300 $Bar_a$). The configuration shown in FIG. 6B provides control of the heating of the PCU's working fluid, even under an irregular, intermittent supply of thermal energy (e.g. from a solar receiver) and at varying charge levels of the thermal energy storage. This configuration also enables limiting the use of relatively costly piping only in the PCU. In this connection, it should be understood that one of the greatest challenges in the configuration of high temperature heat exchangers (T<600° C.) is posed by the pressure difference between the two fluids exchanging heat (a "hotter" fluid transfers heat to a "colder" fluid through a heat exchanging wall). The challenge increases if (i) the temperature increases; (ii) the difference between the pressure of the two fluids increases; (iii) the two fluids are of different kinds (e.g. air and steam, air and $CO_2$, etc.). In some embodiments, the central storage 710B (i.e. additional thermal energy storage unit or a heat exchanger) comprises a plurality of heat exchanger units configured for supplying heat to the PCU fluid. The splitting of one module into two or more units enables reduction of the pressure difference across the heat-transferring wall, e.g. the walls dividing the hotter and colder fluids inside the heat exchanger, or pipe walls inside a storage-like container; this reduces the cost of high temperature heat exchanger configuration and increases their durability and longevity.

As shown in FIG. 6B, more than one heat exchanger 710B may be used. In the non-limiting configuration shown in FIG. 6B, a first intermediate working fluid, in loop 704, is in fluid communication between the thermal storage modules 708 and the first heat exchanger of 710B; a second intermediate working fluid is in fluid communication between the first and the second heat exchangers of 710B, and discharge loop 706 is in fluid communication between the second heat exchanger of 710B and the PCU 110. This configuration alleviates the problem of transferring heat at high temperature from a relatively low-pressure fluid in loop 704 to a relatively high-pressure working fluid in the PCU, thus also in loop 706. In one possible but not limiting example, the pressure in loop 704 could be 5 bar, while the pressure of the PCU working fluid at the point of heat exchange could be 250 bar. This means that if only one heat exchanger is used, the pressure difference across the heat-transferring walls is about 245 bar. This large pressure difference poses a very challenging material and mechanical design problem, especially when the operating temperatures are above 600° C., as expected in applications of the present invention. Using, for example, two heat exchangers in series enables the pressure difference across the heat transferring walls to be halved. In the first (upstream) heat exchanger, the fluid in loop 704, which is at 5 bar will heat another (intermediate) fluid at about 130 bar, so the pressure difference across the heat transferring walls is 125 bar. In the second (downstream) heat exchanger, the fluid at 130 bar will heat the PCU working fluid, which is at 250 bar, so the pressure difference across the heat transferring walls is 120 bar. Hence, this configuration enables to significantly reduce the pressure difference in the heat exchangers, increasing their durability and longevity and lowering their cost, since the construction materials can be far less costly.

It should be understood that the configurations 700A-700B shown in FIGS. 6A-6B enable the following: increasing of the thermal energy storage temperature range (the larger the thermal energy storage temperature range in which thermal energy is stored, the smaller and cheaper is the storage facility); heating of pressurized $CO_2$ flowing in heated tubes to the required PCU upper operating temperature at all times, regardless of the charged level of the thermal energy storage; minimizing the length and number of the relatively expensive pipes carrying high-pressure $CO_2$ and minimizing thermal losses in the thermal energy storage.

The system 700B may optionally comprise combustor 622 described with reference to FIG. 5E above. The system 700B may also comprise a chemical reactor 712, as illustrated in FIGS. 2A-2C, connected in between the thermal energy storage modules 708 and heat exchanger 710B, or between heat exchanger 710B and the PCU 110. It is noted that blowers (or pumps) 714A and 714B may be provided to circulate the flow in the charging loop 702 and intermediate loop 704, whereas the flow in the discharging loop 706 is circulated by the PCU's compressor.

The Levelized Energy Cost (LEC) of power-generation systems is the cost of electricity generation of a given system. It is commonly calculated using Equation 1.

$$LEC = \frac{fcr \bullet \hat{C}_{invest} + \hat{C}_{O\&M} + \hat{C}_{fuel}}{E_{elec,yr}} \quad (1)$$

Where,
$\hat{C}_{invest}$ Total capital invested in construction and installation
$\hat{C}_{O\&M}$ Annual operation and maintenance
$\hat{C}_{fuel}$ Annual fuel costs
$E_{elec,yr}$ Net annual electricity production
The fcr is the Annualized Fixed Charge Rate (or Annuity Factor), defined as, $$fcr = \frac{k_d(1+k_d)^N}{(1+k_d)^N - 1} + k_{insurance} \quad (2)$$

Where, $k_d$ is the real debt interest rate; N is the depreciation period in years (i.e. the system design life); $k_{insurance}$ is the annual insurance cost rate.

Figure 7:
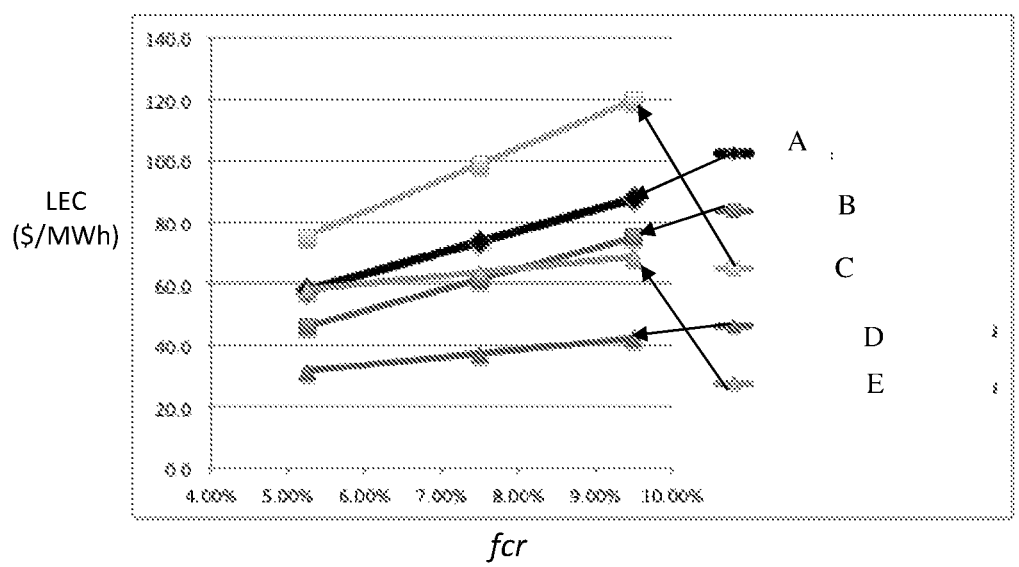
FIG. 7 shows Levelized Energy Cost (LEC) of different power-generation systems.

FIG. 7 shows a comparison between selected existing power generation systems and the system of the present invention. In this specific and non-limiting example, the annual direct solar radiation energy is assumed to be about 2000 kWh/m2/year (5.5 kWh/m2/day). The LEC of combined cycle (CC) does not depend on solar radiation. It greatly depends on the cost of natural gas, and roughly doubles when the cost of natural gas increases from $2.5/MMBtu (Curve D) to $7.0/MMBtu (Curve E). It should be noted that the cost of Liquefied Natural Gas (LNG) is usually >$10/MMBtu. In this example, the LEC of photovoltaic (PV) systems without storage means (Curve B) increases by about 65% when battery storage is added (Curve C). It should be noted that the cost of battery storage was assumed to be $100 kWh and the battery life was equal to the system life (30 years, or ~10,000 cycles), while a discharge of 90% was allowed if the batteries were not charged for 24 hours. Present battery costs are $200/kWh-$400/kWh, so the actual cost increase with the addition of batteries is likely to be much higher than that shown in FIG. 7. In addition, in PV plants, there is no low-cost, simple way to assure uninterrupted electricity supply over a few consecutive days with little or no solar input. Solar thermal systems (Trough, SCR and Dish) are not shown in FIG. 7, because their LEC is >$100/MWh. The LEC of the system of the present invention, represented by Curve A, is not affected by either fuel costs or the addition of storage. It is significantly lower than that of the PV system with storage represented by curve C, and competitive with combined cycle if the fcr is low and natural gas cost is above about $8.0/MMBtu (e.g. very competitive when LNG is used). The LEC of modern coal plants, which must include sulfur scrubbers and ash-removal facilities, is similar to that of the system of the present invention. Taking into consideration the cost benefits of eliminating carbon emission, further improves the attractiveness of the system of the present invention.

The invention claimed is:

1. An energy generation system, comprising:
a solar energy collection arrangement configured and operable for collecting and reflecting concentrated sunlight radiation;
a solar energy receiver configured for receiving the concentrated sunlight radiation from said solar energy collection arrangement and converting said concentrated sunlight radiation to thermal energy in a first working fluid, wherein said solar receiver includes a chimney configured for channeling heat flow generated by natural convection heat losses from said solar receiver;
a thermal energy storage unit comprising at least one thermal energy storage module being configured and operable for storing thermal energy;
a charging piping arrangement connecting between said solar receiver to said thermal energy storage unit and being configured and operable for carrying a first working fluid transferring heat from said solar receiver to said at least one thermal energy storage module, to thereby enable charging said at least one thermal energy storage module with thermal energy, and carrying said first working fluid back to said solar receiver, after said first working fluid exits said thermal energy storage unit;
a power conversion unit configured and operable for accommodating a second working fluid and converting heat delivered by said second working fluid to electricity;
a heat discharging piping arrangement connecting between said thermal energy storage unit to said power conversion unit and being configured and operable for carrying said second working fluid for transferring heat from said at least one thermal energy storage module to said power conversion unit, and carrying said second working fluid back to said at least one thermal energy storage module, after said second working fluid exits said power conversion unit; and
a cooling module configured for utilizing said heat flow to produce chilled water.

2. The system of claim 1, wherein said thermal energy storage unit comprises a plurality of thermal energy storage modules connected to one another via an arrangement of pipes accommodating at least one of said first and said second working fluid.

3. The system of claim 1, wherein at least one of the thermal energy storage modules contains both sensible heat and phase-change materials (PCM), for increasing storage capacity.

4. The system of claim 1, wherein said solar receiver is mounted on said thermal energy storage unit.

5. The system of claim 1, wherein said solar receiver comprises at least one thermoelectric array being configured and operable to absorb said heat flow and use said heat flow to produce electricity.

6. The system of claim 1, wherein said chilled water is used for cooling said second working fluid of said power conversion unit before it is compressed.

7. The system of claim 1, wherein at least a part of said arrangement of pipes of said at least one of said thermal energy storage modules has at least one of a slanted pipe section and a U shape, to thereby reduce piping length.

8. The system of claim 1, further comprising at least one of one or more heat exchangers and one or more additional thermal energy storage modules being in fluid communication with said thermal energy storage unit and said power conversion unit, and being configured for receiving heat from said thermal energy storage unit and for supplying heat to said power conversion unit.

9. The system of claim 8, further comprising an intermediate arrangement of pipes connecting between at least two of the following components: said thermal energy storage unit, said one or more heat exchangers and said additional thermal energy storage modules.

10. An energy generation system, comprising:
a solar energy collection arrangement configured and operable for collecting and reflecting concentrated sunlight radiation;
a solar energy receiver configured for receiving the concentrated sunlight radiation from said solar energy collection arrangement and converting said concentrated sunlight radiation to thermal energy in a first working fluid;
a thermal energy storage unit comprising at least one thermal energy storage module being configured and operable for storing thermal energy;
a charging piping arrangement connecting between said solar receiver to said thermal energy storage unit and being configured and operable for carrying a first working fluid transferring heat from said solar receiver to said at least one thermal energy storage module, to thereby enable charging said at least one thermal energy storage module with thermal energy, and carrying said first working fluid back to said solar receiver, after said first working fluid exits said thermal energy storage unit;
a power conversion unit configured and operable for accommodating a second working fluid and converting heat delivered by said second working fluid to electricity;
a heat discharging piping arrangement connecting between said thermal energy storage unit to said power conversion unit and being configured and operable for carrying said second working fluid for transferring heat from said at least one thermal energy storage module to said power conversion unit, and carrying said second working fluid back to said at least one thermal energy storage module, after said second working fluid exits said power conversion unit;
at least one of one or more heat exchangers and one or more additional thermal energy storage modules being in fluid communication with said thermal energy storage unit and said power conversion unit, and being configured for receiving heat from said thermal energy storage unit and for supplying heat to said power conversion unit; and
an intermediate arrangement of pipes connecting between at least two of the following components: said thermal energy storage unit, said one or more heat exchangers and said additional thermal energy storage modules;
wherein said intermediate arrangement of pipes is configured for accommodating at least one intermediate working fluid being at an intermediate pressure between the pressure of the thermal energy storage unit and that of the power conversion unit.

11. The system of claim 1, wherein at least a portion of said charging piping arrangement configured for carrying said first working fluid back to said solar receiver, after said first working fluid exits said thermal energy storage unit, is located inside at least one of said thermal energy storage modules.

12. The system of claim 1, wherein said thermal energy storage unit comprises at least one thermal insulation portion; at least a portion of said charging piping arrangement or of said heat discharging piping arrangement being accommodated within said thermal insulation portion.

13. The system of claim 1, further comprising a fuel combustor located upstream or downstream of said thermal energy storage unit and being configured for heating said first working fluid or said second working fluid, respectively.

14. The system of claim 1, wherein said power conversion unit comprises a multi-stages turbine and said discharging piping arrangement is configured such that said second working fluid bypasses a first turbine stage and is introduced into a second turbine stage.

15. The system of claim 1, wherein at least one pipe of said charging piping arrangement transferring heat from said solar receiver to said thermal energy storage module is placed inside another pipe of said charging piping arrangement, carrying said first working fluid back from said thermal energy storage unit to said solar receiver, forming an annulus configuration.

16. The system of claim 1, further comprising a chemical reactor in electrical communication with said power conversion unit and/or in fluid communication with said thermal energy storage unit; said chemical reactor being configured and operable for converting reactants to products by chemical reactions and by utilizing either one or both, heat from said thermal energy storage unit, and said electricity generated by said power conversion unit.

17. The system of claim 16, wherein said chemical reactor is configured for using at least some of said electricity generated by said power conversion unit.

18. An energy generation system, comprising:
 a solar energy collection arrangement configured and operable for collecting and reflecting concentrated sunlight radiation;
 a solar energy receiver configured for receiving the concentrated sunlight radiation from said solar energy collection arrangement and converting said concentrated sunlight radiation to thermal energy in a first working fluid;
 a thermal energy storage unit comprising at least one thermal energy storage module being configured and operable for storing thermal energy;
 a charging piping arrangement connecting between said solar receiver to said thermal energy storage unit and being configured and operable for carrying a first working fluid transferring heat from said solar receiver to said at least one thermal energy storage module, to thereby enable charging said at least one thermal energy storage module with thermal energy, and carrying said first working fluid back to said solar receiver, after said first working fluid exits said thermal energy storage unit;
 a power conversion unit configured and operable for accommodating a second working fluid and converting heat delivered by said second working fluid to electricity;
 a heat discharging piping arrangement connecting between said thermal energy storage unit to said power conversion unit and being configured and operable for carrying said second working fluid for transferring heat from said at least one thermal energy storage module to said power conversion unit, and carrying said second working fluid back to said at least one thermal energy storage module, after said second working fluid exits said power conversion unit;
 a chemical reactor in electrical communication with said power conversion unit and/or in fluid communication with said thermal energy storage unit; said chemical reactor being configured and operable for converting reactants to products by chemical reactions and by utilizing either one or both, heat from said thermal energy storage unit, and said electricity generated by said power conversion unit; wherein said chemical reactor is configured for using at least some of said electricity generated by said power conversion unit; and
 a switch connection configured for alternating between electricity production and fuel production and for controlling their respective quantities.

* * * * *